(12) United States Patent
Yamaguchi et al.

(10) Patent No.: US 11,834,035 B2
(45) Date of Patent: Dec. 5, 2023

(54) PARKING ASSISTANCE DEVICE, PARKING ASSISTANCE METHOD, AND COMPUTER-READABLE MEDIUM

(71) Applicant: Panasonic Intellectual Property Management Co., Ltd., Osaka (JP)

(72) Inventors: Toru Yamaguchi, Kanagawa Ken (JP); Takafumi Tokuhiro, Kanagawa Ken (JP); Masashi Hoshino, Tokyo To (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 3 days.

(21) Appl. No.: 17/586,169

(22) Filed: Jan. 27, 2022

(65) Prior Publication Data

US 2022/0274585 A1 Sep. 1, 2022

(30) Foreign Application Priority Data

Mar. 1, 2021 (JP) .................................. 2021-032141

(51) Int. Cl.
*H04N 5/44* (2011.01)
*B60W 30/06* (2006.01)
(Continued)

(52) U.S. Cl.
CPC ............ *B60W 30/06* (2013.01); *B60W 10/18* (2013.01); *B60W 30/143* (2013.01);
(Continued)

(58) Field of Classification Search
CPC .... B60W 30/06; B60W 10/18; B60W 30/143; B60W 40/09; B60W 50/0098;
(Continued)

(56) References Cited

U.S. PATENT DOCUMENTS

| | | | | |
|---|---|---|---|---|
| 2009/0319112 | A1* | 12/2009 | Fregene | ............. B60W 60/0011 |
| | | | | 701/25 |
| 2013/0085637 | A1* | 4/2013 | Grimm | .............. B62D 15/0285 |
| | | | | 701/25 |

(Continued)

FOREIGN PATENT DOCUMENTS

JP 6022447 11/2016

*Primary Examiner* — Munear T Akki
(74) *Attorney, Agent, or Firm* — Greenblum & Bernstein, P.L.C.

(57) ABSTRACT

A parking assistance device according to the present disclosure performs automatic travel of a vehicle based on teaching travel by a driver. The parking assistance device includes a memory and a hardware processor coupled to the memory. The hardware processor is configured to: learn a travel route for parking the vehicle in a parking position and a speed, a steering angle, and braking operation of the vehicle during the teaching travel, based on the teaching travel; and modify the speed, the steering angle, or the braking operation in the automatic travel of the vehicle from the speed, the steering angle, or the braking operation in the teaching travel, based on any of a regulation for the automatic travel of the vehicle, environmental information relating to an environment around the vehicle, or geographic information relating to a road condition around the vehicle.

15 Claims, 6 Drawing Sheets

(51) Int. Cl.
  *B60W 40/09*       (2012.01)
  *B60W 30/14*       (2006.01)
  *B60W 50/00*       (2006.01)
  *B60W 50/14*       (2020.01)
  *B60W 10/18*       (2012.01)
  *G06V 20/58*       (2022.01)

(52) U.S. Cl.
  CPC ........ *B60W 40/09* (2013.01); *B60W 50/0098* (2013.01); *B60W 50/14* (2013.01); *G06V 20/58* (2022.01); *B60W 2050/143* (2013.01); *B60W 2050/146* (2013.01); *B60W 2540/18* (2013.01); *B60W 2540/30* (2013.01); *B60W 2554/80* (2020.02); *B60W 2555/60* (2020.02); *B60W 2556/40* (2020.02)

(58) Field of Classification Search
  CPC ........... B60W 50/14; B60W 2050/143; B60W 2050/146; B60W 2540/18; B60W 2540/30; B60W 2554/80; B60W 2555/60; B60W 2556/40; B60W 60/0011; G06V 20/58; G06V 20/56
  See application file for complete search history.

(56) References Cited

U.S. PATENT DOCUMENTS

| | | | |
|---|---|---|---|
| 2018/0328750 A1* | 11/2018 | Yun | G08G 1/143 |
| 2019/0256144 A1* | 8/2019 | Yamada | B62D 15/0285 |
| 2019/0391588 A1* | 12/2019 | Fujimura | G05D 1/0088 |
| 2022/0126875 A1* | 4/2022 | Hammoud | B60W 30/09 |

* cited by examiner

PARKING ASSISTANCE DEVICE, PARKING ASSISTANCE METHOD, AND COMPUTER-READABLE MEDIUM

CROSS-REFERENCE TO RELATED APPLICATIONS

This application is based upon and claims the benefit of priority from Japanese Patent Application No. 2021-032141, filed on Mar. 1, 2021, the entire contents of which are incorporated herein by reference.

FIELD

The present disclosure relates to a parking assistance device, a parking assistance method, and a computer-readable medium.

BACKGROUND

Conventionally, parking assistance technology is known with which, when a vehicle is parked, the vehicle is moved by automated driving. One such parking assistance technology is a technology that learns a travel route on the basis of teaching travel by the driver and uses the results of that learning to provide parking assistance. This technology is used, for example, when the driver repeatedly parks in a fixed parking position, such as the parking lot at the home or place of work of the driver.

See Japanese Patent No. 6022447, for example

However, since teaching travel is manual driving by the driver, the vehicle speed and steering motion during teaching travel are not necessarily suitable for automated driving.

The present disclosure provides a parking assistance device, a parking assistance method, and a computer-readable medium that enable the behavior of a vehicle to be placed in a state suitable for travel by automated driving when the vehicle is traveling automatically along a travel route based on teaching travel.

SUMMARY

A parking assistance device according to the present disclosure performs automatic travel of a vehicle based on teaching travel by a driver. The parking assistance device includes a memory and a hardware processor coupled to the memory. The hardware processor is configured to: learn a travel route for parking the vehicle in a parking position and a speed, a steering angle, and braking operation of the vehicle during the teaching travel, based on the teaching travel; and modify the speed, the steering angle, or the braking operation in the automatic travel of the vehicle from the speed, the steering angle, or the braking operation in the teaching travel, based on any of a regulation for the automatic travel of the vehicle, environmental information relating to an environment around the vehicle, or geographic information relating to a road condition around the vehicle.

DETAILED DESCRIPTION

Embodiments of the parking assistance device and parking assistance method according to the present disclosure will be described hereinbelow with reference to the drawings.

First Embodiment

Figure 1:
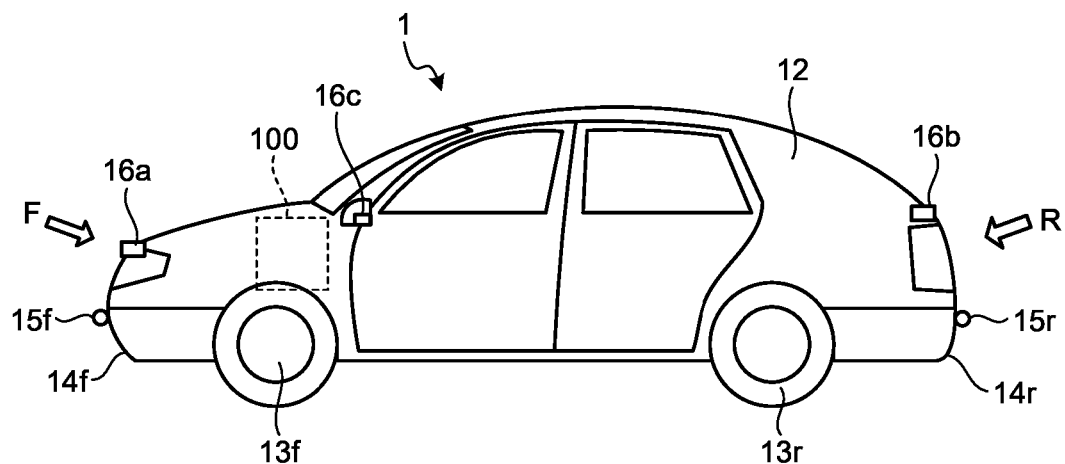
FIG. 1 is a diagram illustrating an example of a vehicle equipped with a parking assistance device according to a first embodiment.

FIG. 1 is a diagram illustrating an example of a vehicle 1 equipped with a parking assistance device 100 according to a first embodiment. As illustrated in FIG. 1, the vehicle 1 is equipped with a vehicle body 12, and two pairs of wheels 13 arranged along a predetermined direction on the vehicle body 12. The two pairs of wheels 13 are equipped with one pair of front tires 13f and one pair of rear tires 13r.

The front tire 13f illustrated in FIG. 1 is an example of a first wheel according to this embodiment. Furthermore, the rear tire 13r is an example of a second wheel according to this embodiment. Note that, although the vehicle 1 illustrated in FIG. 1 is equipped with four wheels 13, the number of wheels 13 is not limited to this quantity. For example, the vehicle 1 may also have two wheels.

The vehicle body 12 is coupled to the wheels 13 and is capable of moving using the wheels 13. In this case, the predetermined direction in which the two pairs of wheels 13 are arranged is the travel direction (movement direction) of the vehicle 1. The vehicle 1 is capable of advancing and retreating through the switching of gears (not illustrated), or the like. Furthermore, the vehicle 1 is also capable of turning left and right through steering.

In addition, the vehicle body 12 has a front end portion F, which is the end on the front tire 13f side, and a rear end portion R, which is the end on the rear tire 13r side. The vehicle body 12 has an approximately rectangular shape in a top view, and the four corner portions of the substantially rectangular shape will sometimes be referred to as ends. Furthermore, although not illustrated in FIG. 1, the vehicle 1 is equipped with a display device, a loudspeaker, and an operating unit.

One pair of bumpers 14 are provided in the vicinity of the lower end of the vehicle body 12, which are the front end portion F and the rear end portion R of the vehicle body 12. Of the one pair of bumpers 14, a front bumper 14f covers a portion of the side surface and the whole of the front surface in the vicinity of the lower end portion of the vehicle body 12. Of the one pair of bumpers 14, a rear bumper 14r covers a portion of the side surface and the whole of the rear surface in the vicinity of the lower end portion of the vehicle body 12.

Transmission/reception units 15f and 15r, which transmit and receive sound waves such as ultrasonic waves, are arranged at a predetermined end of the vehicle body 12. For example, one or more transmission/reception units 15f are arranged on the front bumper 14f, and one or more transmission/reception units 15r are arranged on the rear bumper 14r. When not particularly limited, the transmission/reception units 15f and 15r are simply referred to hereinbelow as the transmission/reception units 15. Furthermore, the quantity and positions of the transmission/reception units 15 are not limited to the example illustrated in FIG. 1. For example, the vehicle 1 may also be equipped with the transmission/reception units 15 on the left and right sides.

Although sonar using ultrasonic waves is described as an example of the transmission/reception units 15 in this embodiment, the transmission/reception units 15 may also be radars that send and receive electromagnetic waves. Alternatively, the vehicle 1 may also be equipped with both sonar and radar. Further, the transmission/reception units 15 may simply be referred to as sensors.

More specifically, the transmission/reception units 15 are equipped with a transmission unit that sends sound waves such as ultrasonic waves or electromagnetic waves, and a reception unit that receives sound waves sent from the transmission unit, or reflected sound waves obtained by electromagnetic waves being reflected by an object. The transmission/reception units 15 detect obstacles around the vehicle 1 on the basis of the results of sound waves or electromagnetic waves being sent and received. Furthermore, the transmission/reception units 15 measure the distance between the vehicle 1 and obstacles around the vehicle 1 on the basis of the results of sending/receiving sound waves or electromagnetic waves.

The vehicle 1 is also equipped with a first imaging device 16a that images the front of the vehicle 1, a second imaging device 16b that images the rear of the vehicle 1, a third imaging device 16c that images the left side of the vehicle 1, and a fourth imaging device that images the right side of the vehicle 1. An illustration of the fourth imaging device is omitted.

When there is no particular distinction to be made, the first imaging device 16a, second imaging device 16b, third imaging device 16c, and fourth imaging device are referred to hereinbelow simply as the imaging devices 16. The positions and quantity of imaging devices are not limited to or by the example illustrated in FIG. 1. For example, the vehicle 1 may also be equipped with only two devices, namely, the first imaging device 16a and the second imaging device 16b. Alternatively, the vehicle 1 may have further imaging devices in addition to those in the abovementioned example.

The imaging devices 16 are cameras which are capable of capturing images around the vehicle 1, such as color images, for example. Note that the captured images captured by the imaging devices 16 may be moving images or still images. Furthermore, the imaging devices 16 may be cameras built into the vehicle 1, or drive recorder cameras or the like which are retrofitted to the vehicle 1.

The parking assistance device 100 is also built into the vehicle 1. The parking assistance device 100 executes the automatic travel of the vehicle 1 on the basis of teaching travel by the driver. The parking assistance device 100 is an information processing device that can be built into the vehicle 1, such as, for example, an electronic control unit (ECU) which is provided inside the vehicle 1 or an on-board unit (OBU). Alternatively, the parking assistance device 100 may be an external device that is provided in the vicinity of the dashboard of the vehicle 1. Note that the parking assistance device 100 may also serve as a car navigation device, or the like.

Figure 2:
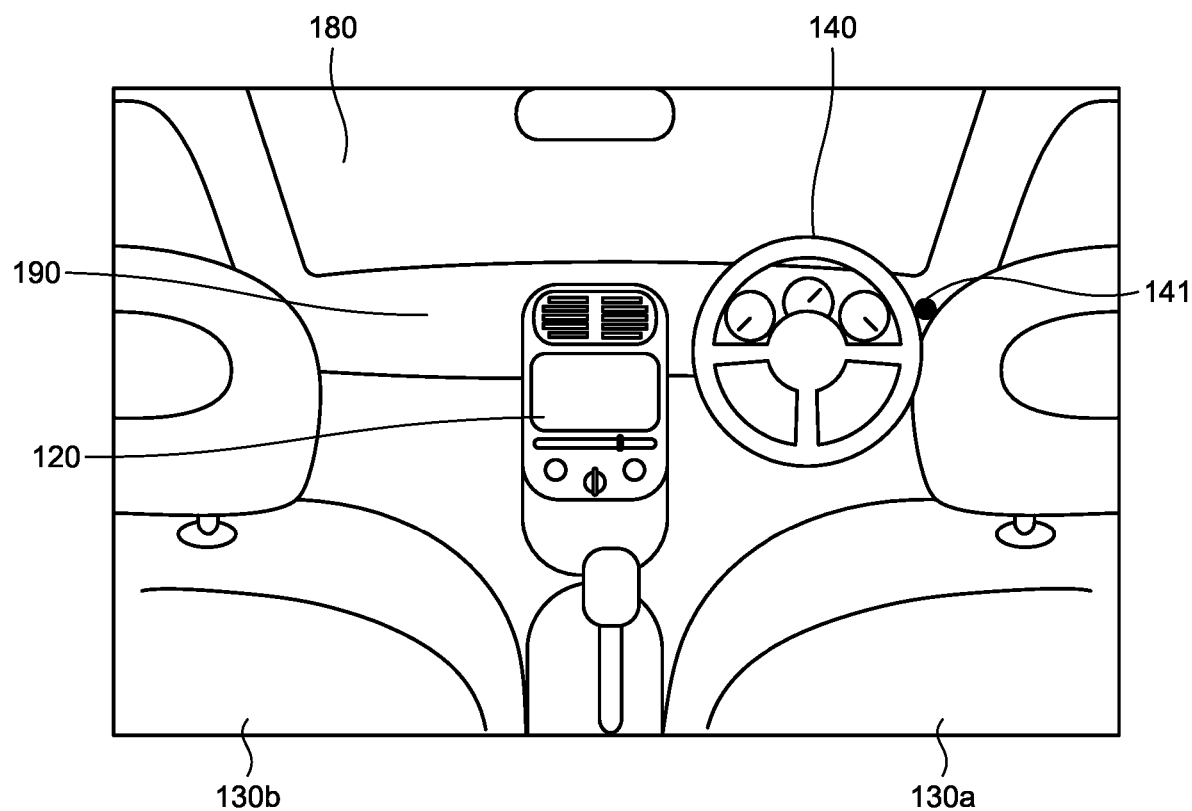
FIG. 2 is a diagram illustrating an example of a configuration in the vicinity of vehicle driving seat according to the first embodiment.

The configuration in the vicinity of the driving seat of the vehicle 1 according to this embodiment will be described next. FIG. 2 is a diagram illustrating an example of a configuration in the vicinity of a driving seat 130a of the vehicle 1 according to the first embodiment.

As illustrated in FIG. 2, the vehicle 1 is equipped with the driving seat 130a and a passenger seat 130b. In front of the driving seat 130a, there is a windshield 180, a dashboard 190, a steering wheel 140, a display device 120, and an operation button 141.

The display device 120 is a display installed in the dashboard 190 of the vehicle 1. The display device 120 is, by way of an example, located in the center of the dashboard 190, as illustrated in FIG. 2. The display device 120 is, for example, a liquid crystal display, or an organic electroluminescence (EL) display. The display device 120 can also serve as a touch panel.

The windshield 180 also becomes a head-up display capable of displaying images when images are projected by a projection device (not illustrated). The display device 120 and the head-up display are examples of the display unit according to this embodiment.

Furthermore, the steering wheel 140 is provided in the front surface of the driving seat 130a and can be operated by the driver. The angle of rotation, that is, the steering angle, of the steering wheel 140 is electrically or mechanically linked to the change in direction of the front tires 13f, which are the steered wheels. Note that the steered wheels may be the rear tires 13r, or both the front tires 13f and the rear tires 13r may be the steered wheels.

The operation button 141 is a button that enables operations by the user to be received. Note that, in this embodiment, the user is, for example, the driver of the vehicle 1. The operation button 141 receives an operation from the driver to start parking assistance, for example, by receiving a press from the driver. Note that the position of the operation button 141 is not limited to or by the example illustrated in FIG. 2, and may be provided on the steering wheel 140, for example. The operation button 141 is an example of the operating unit according to this embodiment. If the display device 120 also serves as a touch panel, the display device 120 may also be an example of the operating unit. Furthermore, an operation terminal capable of transmitting a signal to the vehicle 1 from outside the vehicle 1, such as a remote controller or an electronic key (not illustrated), may also be used as an example of the operating unit.

Figure 3:
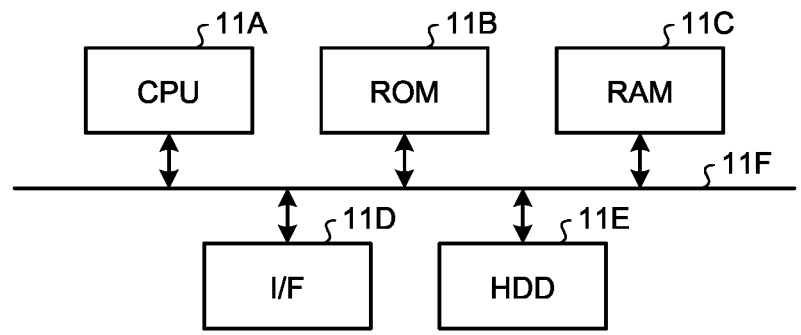
FIG. 3 is a diagram illustrating an example of a hardware configuration of the parking assistance device according to the first embodiment.

Next, the hardware configuration of the parking assistance device 100 will be described. FIG. 3 is a diagram illustrating an example of the hardware configuration of the parking assistance device 100 according to the first embodiment. As illustrated in FIG. 3, the parking assistance device 100 has a hardware configuration that utilizes an ordinary computer, in which a central processing unit (CPU) 11A, a read-only memory (ROM) 11B, a random-access memory (RAM) 11C, an interface (I/F) 11D, a hard disk drive (HDD) 11E, or the like, are connected to each other via a bus 11F.

The CPU 11A is a computation device that controls the whole ECU. Note that the CPU 11A is an example of a processor in the parking assistance device 100 according to this embodiment, and that another processor or processing circuit may also be provided in place of the CPU 11A. The ROM 11B stores programs and the like that implement various types of processing by the CPU 11A. The RAM 11C is, for example, the main storage device of the parking assistance device 100, and stores the data necessary for various types of processing by the CPU 11A. The I/F 11D is an interface for sending and receiving data. The I/F 11D may also send and receive information to and from other ECUs installed in the vehicle 1 via a controller area network (CAN) or the like in the vehicle 1.

The functions of the vehicle 1 according to this embodiment will be described next. The vehicle 1 according to this embodiment learns a travel route on the basis of teaching travel by the driver and uses the results of that learning to perform parking assistance. Such parking assistance is effective in reducing the effort by the driver when parking repeatedly at a fixed parking position, such as, for example, the garage of the driver's home, a contracted parking position at an apartment complex, or a designated parking position in the parking lot of the driver's workplace. For this reason, this type of parking assistance is referred to as home zone parking.

Figure 4:
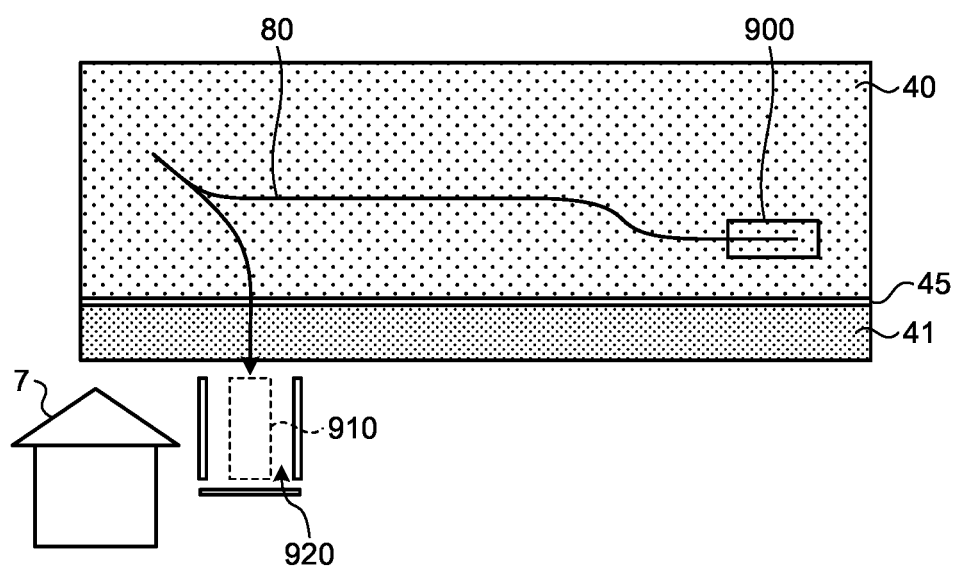
FIG. 4 is a diagram serving to illustrate an example of parking assistance according to the first embodiment.

FIG. 4 is a diagram serving to illustrate an example of parking assistance according to the first embodiment. A travel route 80 illustrated in FIG. 4 is the route that the vehicle 1 moves from a travel start position 900 to a parking position 910.

The parking position 910 is located, for example, within a garage 920 at a home 7 of the driver of the vehicle 1, but is not limited to or by this location. In the example illustrated in FIG. 4, the travel start position 900 is on a roadway 40. The roadway 40 is assumed to be a public road. Furthermore, the entrance and exit of the garage 920 faces a sidewalk 41. There is also a step 45 at the boundary between the roadway 40 and the sidewalk 41. In moving from the roadway 40 to the garage 920, the vehicle 1 passes across the step 45 and the sidewalk 41.

The parking assistance device 100 according to this embodiment performs home zone parking, which involves learning the travel route 80 and parking the vehicle 1 in the parking position 910 on the basis of the learned travel route 80. The parking position 910 is the goal of the travel route using home zone parking, and is also referred to as the target position. Note that the travel route 80 illustrated in FIG. 4 is an example, and that the environment in which the home zone parking according to this embodiment can be applied is not limited thereto.

Figure 5:
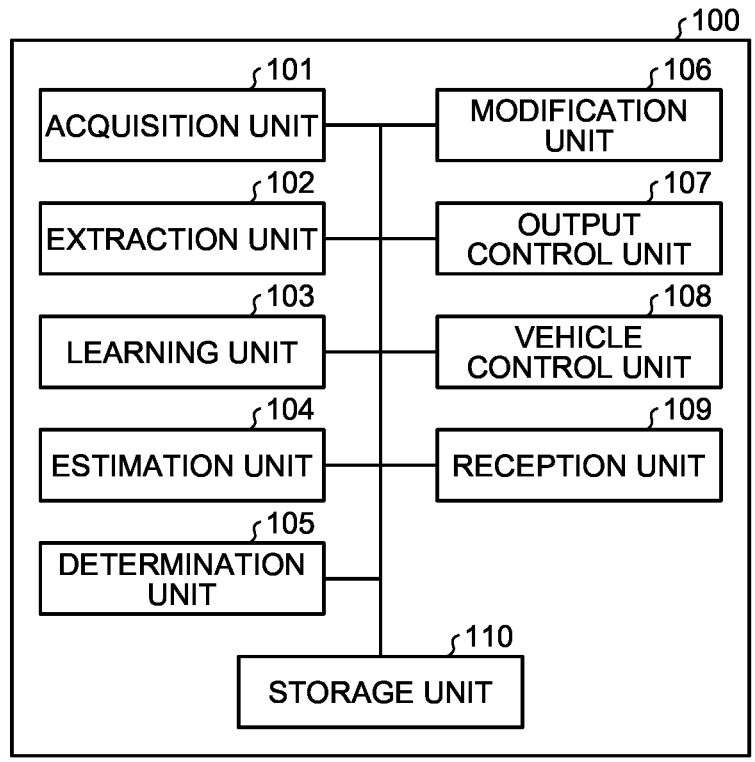
FIG. 5 is a block diagram illustrating an example of the functions of the parking assistance device according to the first embodiment.

The details of the functions of the parking assistance device 100 according to this embodiment will be described next. FIG. 5 is a block diagram illustrating an example of the functions of the parking assistance device 100 according to the first embodiment.

As illustrated in FIG. 5, the parking assistance device 100 according to this embodiment is equipped with an acquisition unit 101, an extraction unit 102, a learning unit 103, an estimation unit 104, a determination unit 105, a modification unit 106, an output control unit 107, a vehicle control unit 108, a reception unit 109, and a storage unit 110.

The storage unit 110 is configured from the ROM 11B, the RAM 11C, or the HDD 11E, for example. Note that, in FIG. 5, although one storage unit 110 is disclosed as being included in the parking assistance device 100, a plurality of storage media may also function as the storage unit 110.

The storage unit 110 stores programs and data used in the various types of processing executed by the parking assistance device 100. For example, the program executed by the parking assistance device 100 according to this embodiment has a modular configuration that includes each of the above-mentioned units (the acquisition unit 101, extraction unit 102, learning unit 103, estimation unit 104, determination unit 105, modification unit 106, output control unit 107, vehicle control unit 108, and reception unit 109), and in terms of actual hardware, each of the above-mentioned units is loaded into the RAM 11C due to the CPU 11A reading and executing a program from the storage unit 110, and the acquisition unit 101, extraction unit 102, learning unit 103, estimation unit 104, determination unit 105, modification unit 106, output control unit 107, vehicle control unit 108, and reception unit 109 are generated on the RAM 11C.

The program executed by the parking assistance device 100 according to this embodiment is provided as a file in an installable format or an executable format, and is recorded on a computer-readable recording medium such as a CD-ROM, flexible disk (FD), CD-R, or DVD (Digital Versatile Disk).

Furthermore, the program executed by the parking assistance device 100 according to this embodiment may be configured to be stored on a computer connected to a network such as the internet or to be provided by being downloaded over the network. The program executed by the parking assistance device 100 according to this embodiment may also be configured so as to be provided or distributed via a network such as the Internet. In addition, the program to be executed by the parking assistance device 100 according to this embodiment may also be configured to be provided incorporated into the ROM 11B, or the like, beforehand.

The storage unit 110 also stores a regulation for automatic travel of the vehicle 1, and map information.

The regulation for automatic travel of the vehicle 1 is a regulation for the speed, the steering angle, or the necessity of a temporary stop of the vehicle 1, which is applied when the vehicle 1 travels automatically. The regulation for automatic travel of the vehicle 1 is defined, for example, by a law, or a standard. More specifically, the regulation for automatic travel of the vehicle 1 is defined by an international standard such as ISO 20900 (2019 Intelligent transport systems—Partially automated parking systems: PAPS), or by the law of each country. As an example, PAPS stipulates that the vehicle speed during partially automated parking is generally 10 km/h or less.

Furthermore, the regulation for automatic travel of the vehicle 1 is not limited to a regulation specific to automated driving, but may also be a regulation relating to general driving of the vehicle 1. For example, a regulation for the general driving of the vehicle 1 includes the location of a temporary stop as defined by the Road Traffic Law.

Furthermore, the regulation for automatic travel of the vehicle 1 may be not only a law or a rule, but also a regulation based on the ride comfort of the passenger or the effect on the people around the vehicle 1 during the automatic travel of the vehicle 1. For example, even if the vehicle speed is less than or equal to that defined by a law, or a standard, the vehicle speed may be too fast in terms of the ride comfort of the passenger of the vehicle 1. The effect on the people around the vehicle 1 is, for example, that when the vehicle 1 is traveling by automated driving, the people around the vehicle 1 are surprised or are given the impression that travel is dangerous.

In this embodiment, the storage unit 110 stores a speed slower than the speed defined by a law or a standard as a threshold value for the vehicle speed during automatic travel in order to improve the ride comfort of the passenger of the vehicle 1 and the sense of security of those around the vehicle 1. Note that the threshold value may be pre-registered at the time of shipment of the parking assistance device 100, or may be set by the user.

Additionally, even if the speed is less than or equal to the threshold value, the ride comfort may deteriorate depending on the magnitude of the steering angle or the frequency of modification. For example, if a large steering operation is performed while the speed is reduced due to automated driving, shaking of the vehicle body 12 may become more significant, and the ride comfort may worsen. Hence, in this embodiment, the storage unit 110 stores a condition for the combination of speed and steering angle as one of the regulations for automatic travel of the vehicle 1.

Moreover, since a law and the like are subject to revision, the regulation for automatic travel of the vehicle 1 stored in the storage unit 110 is updated periodically.

The map information is a digital map that includes information about the roads around the vehicle 1. Note that the map information does not have to be stored in the parking assistance device 100, and may also be acquired from the Internet during usage. The map information is an example of geographic information relating to the road conditions around the vehicle 1 according to this embodiment.

The acquisition unit 101 acquires vehicle information and environmental information from the imaging devices 16, the transmission/reception units 15, various sensors, or other ECUs, which are mounted on the vehicle 1.

Vehicle information is information relating to the behavior of the vehicle 1. Vehicle information includes, for example, information relating to the speed, steering angle, and braking operation of the vehicle 1. The information about the braking operation is, for example, the time when the brakes were applied to the vehicle 1 and the information about the strength of the brakes.

Environmental information is information about the environment around the vehicle 1. For example, the environmental information includes the presence or absence of obstacles around the vehicle 1 and the distance between the vehicle 1 and the obstacles. More specifically, the acquisition unit 101 acquires the presence or absence of obstacles detected by the transmission/reception units 15 and the distance between obstacles around the vehicle 1 and the vehicle 1 measured by the transmission/reception units 15.

Note that the environmental information may also include additional information. For example, the images captured in the vicinity of the vehicle 1 may also be included in the environmental information. The acquisition unit 101 acquires the images captured in the vicinity of the vehicle 1 from the imaging devices 16. The images are referred to hereinbelow as the surrounding images. More specifically, the acquisition unit 101 acquires a plurality of surrounding images when the vehicle 1 learns a travel route based on teaching travel and when the vehicle 1 performs automatic travel based on the learned travel route.

Furthermore, the acquisition unit 101 acquires a regulation for automatic travel of the vehicle 1 via a network such as the Internet, and saves the same in the storage unit 110. This processing may be executed periodically, for example, or may be executed when the acquisition unit 101 acquires a notification for a law revision or the like.

The extraction unit 102 extracts feature points from the surrounding images. The technique for extracting feature points by the extraction unit 102 is not particularly limited, and any known technique may be applied. For example, the extraction unit 102 extracts the feature points using techniques such as Features from Accelerated Segment Test (FAST) or Oriented FAST and Rotated BRIEF (ORB). Furthermore, the extraction unit 102 may, when learning the travel route 80, preferentially record the feature points that satisfy a designated condition among the extracted feature points. For example, the feature points extracted from a plurality of surrounding images that are chronologically contiguous and for which the distance the vehicle 1 has moved during imaging is longer may be preferentially selected as feature points.

On the basis of the teaching travel by the driver, the learning unit 103 learns the travel route 80 on which the vehicle 1 is parked in the parking position 910, and the speed, steering angle, and braking operation of the vehicle 1 during the teaching travel. Furthermore, when learning the travel route 80, the learning unit 103 learns the changes in the position of the vehicle 1 on the basis of the changes in the feature points extracted from the plurality of surrounding images captured during the teaching travel. The learning unit 103 also learns the speed, steering angle, and braking operation of the vehicle 1 during teaching travel.

The teaching travel according to this embodiment is travel in which the driver moves the vehicle 1 from the travel start position 900 outside the parking position to the parking position 910 by using manual driving. According to this embodiment, the learning unit 103 learns the travel start position 900 in the teaching travel as the start position of the travel route 80. Note that the distance from the travel start position 900 to the parking position 910 should be, for example, on the order of 50 meters, but is not limited to this distance.

For example, the driver starts teaching travel from a state where the vehicle 1 has stopped in a position different from the parking position 910, for example, in a desired position outside the garage 920, and causes the vehicle 1 to travel backward to the parking position 910 inside the garage 920. Note that teaching travel is not limited to or by backward travel, and may also be forward travel.

During the teaching travel, the above-mentioned acquisition unit 101 acquires surrounding images and vehicle information. In addition, during the teaching travel, the above-mentioned extraction unit 102 extracts feature points from the surrounding images acquired by the acquisition unit 101. The learning unit 103 records the route traveled by the vehicle 1 by using manual driving as the travel route 80 on the basis of the extracted feature points and the vehicle information at the time when the surrounding images from which the feature points were extracted were captured. Specifically, when the driver performs teaching travel to park the vehicle 1 at the parking position 910 using backward travel, the travel route 80 will also be the route where the vehicle 1 parks at the parking position 910 by using backward travel. Furthermore, according to this embodiment, the position in which the teaching travel is started is the travel start position 900 of the travel route 80. The learning unit 103 saves the recorded travel route information defining the travel route 80 in the storage unit 110.

The travel route information is saved in the storage unit 110 as information that chronologically associates, for example, the speed, steering angle, and braking operation of the vehicle 1 during teaching travel and the feature points extracted from the plurality of surrounding images captured along with the movement of the vehicle 1 during the teaching travel. Note that the technique for learning the travel route 80 and the way the travel route is defined are not limited to this example.

The estimation unit 104 estimates the position of the vehicle 1 on the basis of the surrounding images.

More specifically, the estimation unit 104 reads the travel route 80 from the storage unit 110 when an operation to start home zone parking is received by the driver by using the reception unit 109 (described subsequently). The estimation unit 104 then estimates the position of the vehicle 1 and the travel start position 900 of the travel route 80 on the basis of the travel route 80 and the feature points extracted from the surrounding images by the extraction unit 102.

The estimation unit 104 compares the feature points of the surrounding images at the time of learning the travel route 80 with the feature points of the surrounding images at the time when the operation to start the home zone parking is received. Based on the differences in these feature points, the estimation unit 104 estimates the position and orientation of the vehicle 1 at the time when the operation to start home zone parking is received. Note that the estimation unit 104 does not have to specify the travel start position 900 and the current position of the vehicle 1 as absolute positions, and only has to identify the relative positional relationship between the travel start position 900 and the current position of the vehicle 1. Note that the technique for estimating the position of the vehicle 1 and the travel start position 900 as used by the estimation unit 104 is not limited to or by this example.

The estimation unit 104 sends the estimated position of the vehicle 1 and the travel start position 900 to the output control unit 107 (described subsequently).

The estimation unit 104 also estimates the position of the vehicle 1 while the vehicle 1 is automatically traveling due to the vehicle control unit 108 described subsequently, on the basis of the feature points included in the travel route information and the feature points extracted from the surrounding images acquired during the automatic travel. The estimation unit 104 sends the estimated position of the vehicle 1 to the vehicle control unit 108.

The determination unit 105 determines whether the travel route 80 learned by the learning unit 103 and the behavior of the vehicle 1 during the teaching travel satisfy the regulation for automatic travel of the vehicle 1, on the basis of any of the regulation for automatic travel of the vehicle 1, environmental information, or geographic information. According to this embodiment, the determination unit 105 performs the determination when automated driving based on the travel route 80 is started. The behavior of the vehicle 1 during teaching travel is the speed, steering angle, and braking operation of the vehicle 1. Note that the determination unit 105 may perform the determination processing on the basis of any one or two of the regulation for automatic travel of the vehicle 1, environmental information, and geographic information, or may perform the determination processing on the basis of all of the regulation for automatic travel of the vehicle 1, environmental information, and geographic information.

More specifically, when the operation to start home zone parking is received by the reception unit 109, the determination unit 105 reads the travel route information from the storage unit 110. The determination unit 105 determines whether or not the travel route information thus read out satisfies the regulation for automatic travel of the vehicle 1. Upon determining that the travel route 80 does not satisfy the regulation for automatic travel of the vehicle 1, the determination unit 105 sends the regulation with which the travel route 80 is not satisfied to the modification unit 106.

The modification unit 106 modifies the speed, steering angle, or braking operation of the vehicle 1 during automatic travel from the speed, steering angle, or braking operation during teaching travel on the basis of a regulation for automatic travel of the vehicle 1, environmental information relating to the environment around the vehicle 1, and geographic information relating to the road conditions around the vehicle 1. In other words, the modification unit 106 does not reproduce the recorded teaching travel as is, but rather corrects same to satisfy the regulation for automatic travel of the vehicle 1. According to this embodiment, the modification unit 106 performs a modification to the speed, steering angle, or braking operation when automated driving based on the travel route 80 is started.

More specifically, the modification unit 106 modifies the travel route 80 or the speed, steering angle, or braking operation when the determination unit 105 determines that the travel route 80 or the behavior of the vehicle 1 during teaching travel does not satisfy the regulation for automatic travel of the vehicle 1.

For example, when the speed during teaching travel is greater than or equal to a threshold value, the modification unit 106 modifies the speed to be less than or equal to the threshold value. Note that, in this case, the trajectory of the travel route 80 may be the same as that of the teaching travel.

Furthermore, when the combination of the speed and the steering angle during teaching travel does not satisfy the regulation for automatic travel of the vehicle 1, the modification unit 106 smooths the travel route 80 by modifying the combination of speed and steering angle.

In addition, the modification unit 106 modifies the braking operation to implement a temporary stop even at points where the vehicle has not temporarily stopped during teaching travel, when a temporary stop is required by the regulation for automatic travel of the vehicle 1. A location where a temporary stop is required according to the regulation is, for example, the sidewalk 41 that exists between the roadway 40 and the garage 920.

When the driver has not performed a temporary stop while crossing the sidewalk 41 upon performing teaching travel, the modification unit 106 modifies the braking operation to implement a temporary stop while crossing the sidewalk 41 during automated driving. Whether or not the sidewalk 41 is on the travel route 80 may be determined by the foregoing determination unit 105 on the basis of the environmental information acquired by the acquisition unit 101 or the map information saved in the storage unit 110. For example, there is a step 45 at the boundary between the roadway 40 and the sidewalk 41. When the step is detected using the transmission/reception units 15 or the surrounding images, the determination unit 105 specifies the position where the travel route 80 enters the sidewalk 41 and determines whether a braking operation is performed at the position in the behavior of the vehicle 1 recorded during teaching travel.

The modification unit 106 may also modify the behavior of the vehicle 1 recorded during the teaching travel on the basis of the environmental information. Environmental information includes the presence or absence of obstacles around the vehicle 1 and the distance between the vehicle 1 and the obstacles around the vehicle 1, as described above. For example, when there is an obstacle such as another vehicle in the vicinity of the travel route 80, the modification unit 106 may temporarily stop the vehicle 1 or modify the travel route 80 to move away from the obstacle.

Note that, according to this embodiment, the determination unit 105 and the modification unit 106 are described separately, but one functional unit may also be provided with these functions.

When the modification unit 106 modifies the speed, steering angle, or braking operation, the output control unit 107 notifies the passenger of the vehicle 1 that the vehicle 1 will behave differently than during teaching travel. The output control unit 107 may also notify the driver to check the surroundings when the vehicle 1 temporarily stops during automatic travel.

Figure 6:
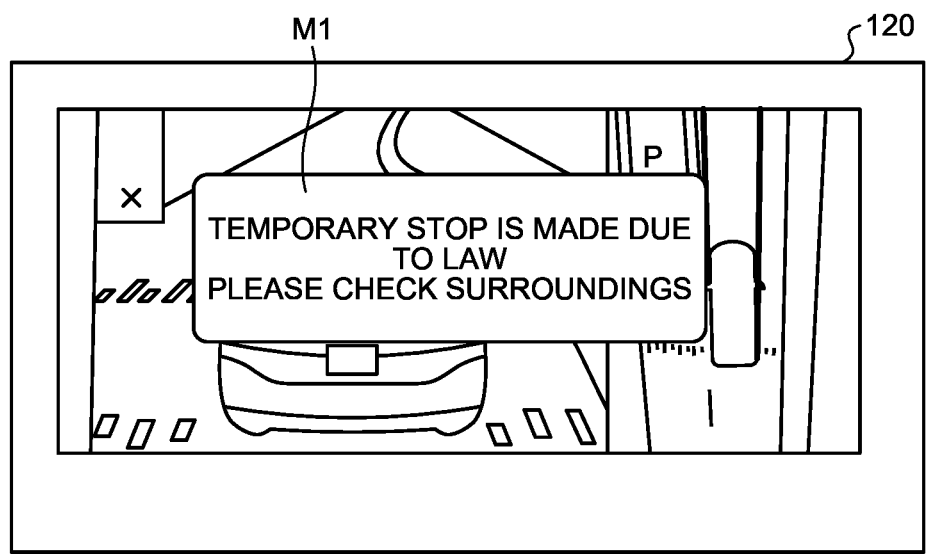
FIG. 6 is a diagram illustrating an example of notification according to the first embodiment.

FIG. 6 is a diagram illustrating an example of notification according to the first embodiment. As illustrated in FIG. 6, the output control unit 107 displays a message on the display device 120 such as "A temporary stop is made due to a law please check surroundings". The output control unit 107 may also notify the passenger of the vehicle 1 that the vehicle 1 will behave differently than during teaching travel by displaying symbols or figures signifying caution on the head-up display. Note that the notification technique used by the output control unit 107 is not limited to a display, rather, the output control unit 107 may also output a message using voice from the loudspeaker of the vehicle 1.

Returning to FIG. 5, the vehicle control unit 108 causes the vehicle 1 to move to the parking position 910 by automated driving based on the travel route 80. The vehicle control unit 108 causes the vehicle 1 to travel automatically by controlling the steering, braking, and acceleration/deceleration of the vehicle 1. According to this embodiment, the vehicle control unit 108 causes the vehicle 1 to travel automatically along the learned travel route 80. Such a travel control technique is also called regenerating the travel route 80.

Furthermore, when the speed, steering angle, or braking operation is modified by the modification unit 106, the vehicle control unit 108 causes the vehicle 1 to move to the parking position 910 by automated driving based on the modified speed, steering angle, or braking operation.

Note that, according to this embodiment, the driver may be seated in the driving seat 130a of the vehicle 1 during the automatic travel of the vehicle control unit 108, or may have disembarked from the vehicle 1.

Further, when the vehicle 1 deviates from the travel route 80, the vehicle control unit 108 uses feedback control to move the vehicle 1 back to the travel route 80. For example, the vehicle control unit 108 estimates the difference between the position of the vehicle 1 and the travel route 80 on the basis of the position of the vehicle 1 estimated by the estimation unit 104, and causes the vehicle 1 to travel so as to reduce the difference.

In addition, although FIG. 5 illustrates the parking assistance device 100 as being equipped with the vehicle control unit 108, the vehicle control unit 108 may also be implemented by another ECU outside the parking assistance device 100.

The reception unit 109 receives various operations from the driver. For example, the reception unit 109 receives an operation to start parking assistance when, for example, the operation button 141 is pressed. Further, when the display device 120 is a touch panel, the operation to start parking assistance may be received when an image button on the touch panel is pressed.

Next, the flow of parking assistance processing executed by the parking assistance device 100 according to this embodiment configured as described above will be described.

Figure 7:
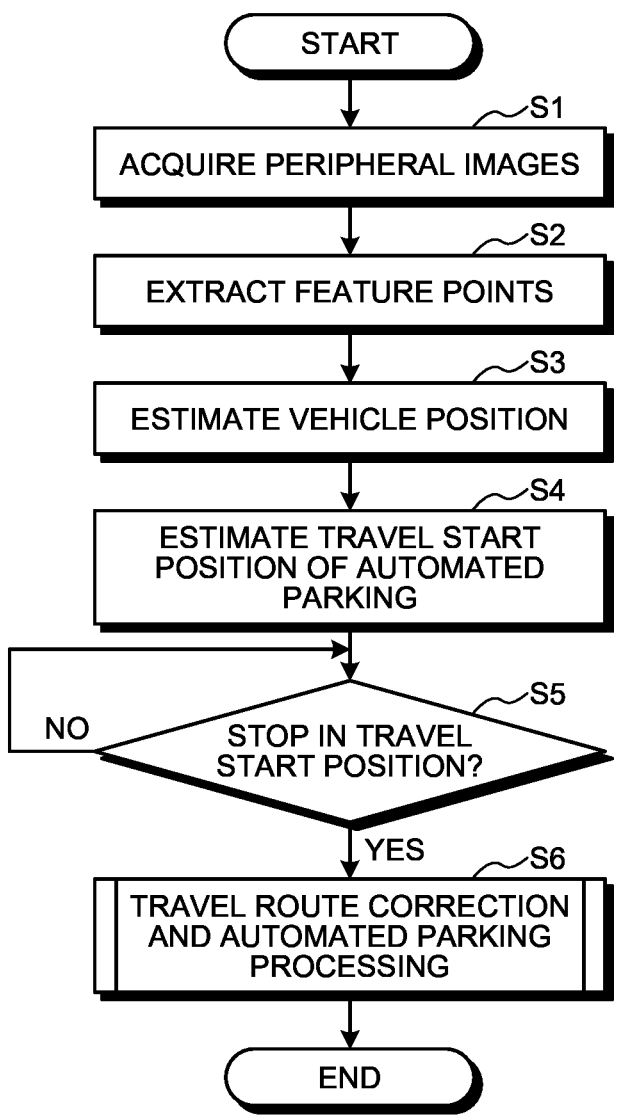
FIG. 7 is a flowchart illustrating an example of the flow of parking assistance processing executed by the parking assistance device according to the first embodiment.

FIG. 7 is a flowchart illustrating an example of the flow of parking assistance processing executed by the parking assistance device 100 according to the first embodiment.

FIG. 7 illustrates the processing until automated driving starts. The processing of this flowchart starts, for example, when an operation to start parking assistance is received by the reception unit 109. Note that it is assumed that, before the processing of this flowchart is executed, the travel route 80 based on teaching travel has been learned by the learning unit 103.

First, the acquisition unit 101 acquires a surrounding images from the imaging devices 16 (S1).

The extraction unit 102 then extracts feature points from the surrounding images acquired by the acquisition unit 101 (S2).

Next, the estimation unit 104 reads the travel route information from the storage unit 110 and estimates the position of the vehicle 1 on the basis of the travel route 80 defined in the travel route information and the feature point extracted from the surrounding images by the extraction unit 102 (S3).

The estimation unit 104 also estimates the travel start position 900 of automated parking on the basis of the travel route 80 and the feature point extracted from the surrounding images by the extraction unit 102 (S4).

Furthermore, while the vehicle 1 is moving to the travel start position 900, the acquisition unit 101 continuously acquires surrounding images from the imaging devices 16. The extraction unit 102 also extracts feature points from the acquired surrounding images. The acquisition unit 101 also acquires vehicle information, and the presence or absence of obstacles around the vehicle 1 and the distance to the obstacles. The estimation unit 104 estimates the position of the vehicle 1, which changes due to the travel of the vehicle 1, on the basis of the movement of feature points or vehicle information extracted from the surrounding images.

The vehicle control unit 108 then determines whether or not the vehicle 1 has stopped at the travel start position 900 (S7). If the vehicle 1 has not reached the travel start position 900 (S5 "No"), the vehicle control unit 108 waits for the vehicle 1 to reach the travel start position 900 and stop.

When the vehicle 1 reaches the travel start position 900 and stops (S5 "Yes"), the travel route correction and automated driving processing then starts (S6).

Figure 8:
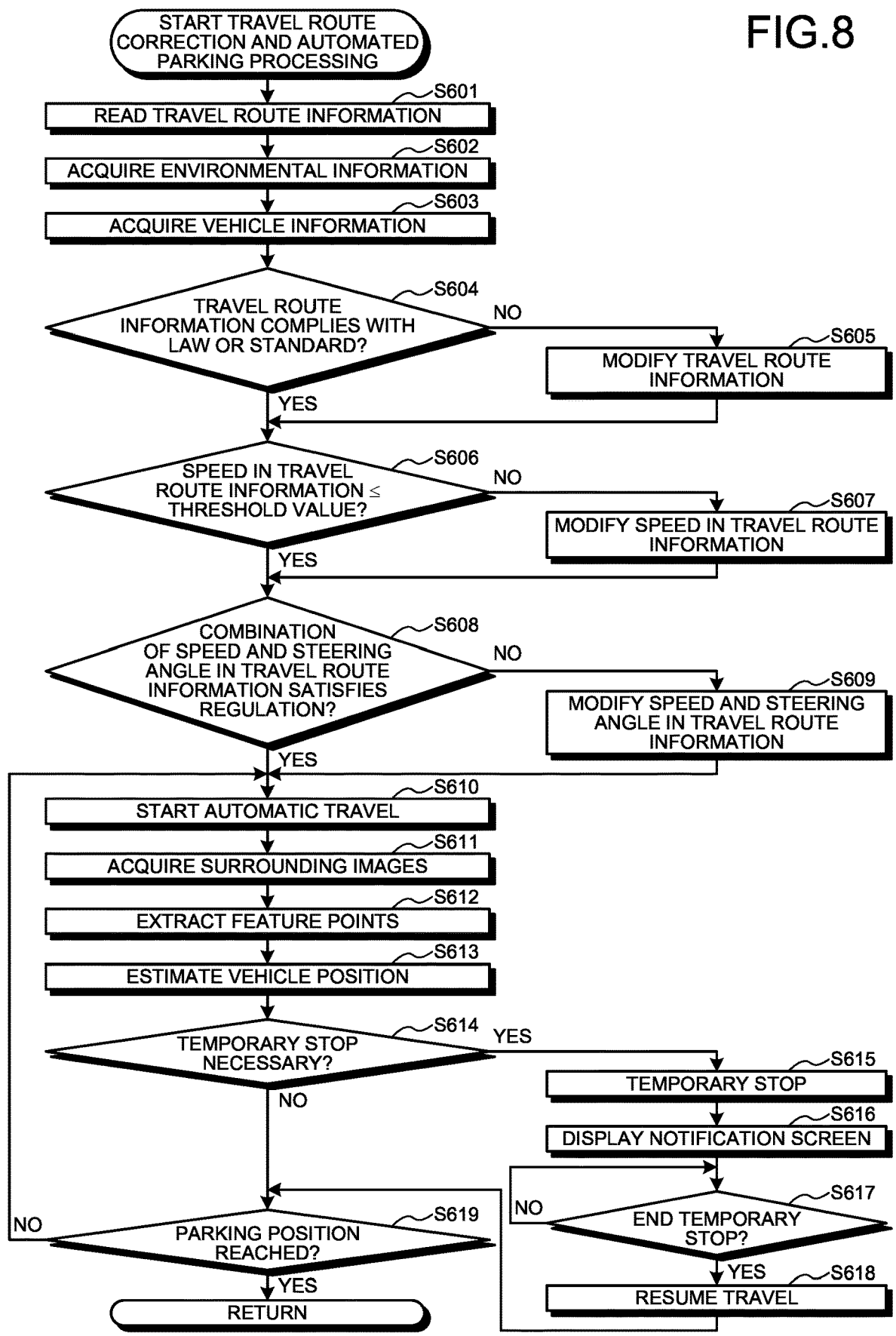
FIG. 8 is a flowchart illustrating an example of the flow of travel route correction and automated driving processing which are executed by the parking assistance device according to the first embodiment.

FIG. 8 is a flowchart illustrating an example of the flow of travel route correction and automated driving processing which are executed by the parking assistance device 100 according to the first embodiment.

First, the determination unit 105 reads the travel route information from the storage unit 110 (S601). The determination unit 105 may also read the map information from the storage unit 110.

In addition, the acquisition unit 101 acquires environmental information from the transmission/reception units 15 mounted in the vehicle 1 (S602).

The acquisition unit 101 also acquires vehicle information from various sensors or other ECUs mounted on the vehicle 1 (S603).

Next, the determination unit 105 determines whether or not the travel route information satisfies the regulation for automatic travel of the vehicle 1.

Specifically, the determination unit 105 determines whether the travel route information complies with the law or standard (S604). For example, the determination unit 105 identifies, on the basis of the map information, the position where the travel route 80 defined in the travel route information passes over the sidewalk 41. The determination unit 105 then compares the record of the braking operation included in the travel route information with the position where the travel route 80 passes over the sidewalk 41 to determine whether the braking operation included in the travel route information complies with the temporary stop specified in the law. The determination unit 105 also determines whether the travel route information complies with the various regulations for automatic travel of the vehicle 1 which are stored in the storage unit 110, rather than being limited to a determination of whether or not the vehicle is has temporarily stopped.

If the determination unit 105 determines that the travel route information does not comply with the regulation for automatic travel of the vehicle 1 (S604 "No"), the determination unit 105 sends the regulation not satisfied by the travel route 80 to the modification unit 106.

In this case, the modification unit 106 modifies the travel route information to satisfy the regulation that has been determined by the determination unit 105 as not being satisfied (S605). For example, the modification unit 106 adds a braking operation to implement a temporary stop before the travel route 80 crosses the sidewalk 41.

Further, if the determination unit 105 determines that the travel route information complies with the regulation for automatic travel of the vehicle 1 (S604 "Yes"), the determination unit 105 determines whether the speed included in the travel route information is less than or equal to a threshold value (S606).

Upon determining that the speed included in the travel route information is faster than the threshold value (S606 "No"), the determination unit 105 notifies the modification unit 106 that the speed is faster than the threshold value.

In this case, the modification unit 106 modifies the speed included in the travel route information to less than or equal to the threshold value (S607).

Furthermore, upon determining that the speed included in the travel route information is less than or equal to the threshold value (S606 "Yes"), the determination unit 105 determines whether the combination of the speed and the steering angle included in the travel route information satisfies the designated condition (S608).

Furthermore, upon determining that the combination of the speed and the steering angle included in the travel route information does not satisfy the designated condition (S608 "No"), the determination unit 105 notifies the modification unit 106 of the range on the travel route 80 where the combination of the speed and the steering angle does not satisfy the designated condition.

In this case, the modification unit 106 modifies the speed and the steering angle included in the travel route information to satisfy the designated condition (S609).

The modification unit 106 then sends the modified travel route information to the vehicle control unit 108. Further, when the travel route information based on the teaching travel satisfies all the regulations, the modification unit 106 notifies the vehicle control unit 108 that there is no modification to the travel route information.

Next, the vehicle control unit 108 starts the automatic travel (S610). When the travel route information is modified by the modification unit 106, the vehicle control unit 108 controls the vehicle 1 on the basis of the modified travel route information. Further, when there is no modification to the travel route information, the vehicle control unit 108 controls the vehicle 1 on the basis of the travel route information stored in the storage unit 110.

In addition, during automatic travel, the acquisition unit 101 continuously acquires the surrounding images (S611). The extraction unit 102 then extracts the feature points from the surrounding images (S612).

The estimation unit 104 then estimates the position of the vehicle 1 on the basis of the extracted feature points (S613). The acquisition unit 101 may also continuously acquire environmental information and vehicle information during automatic travel.

The determination unit 105 also determines whether the vehicle 1 needs to make a temporary stop (S614). For example, when the current position of the vehicle 1 estimated by the estimation unit 104 is the position of a temporary stop defined by the travel route information, the determination unit 105 determines that the vehicle 1 needs to make a temporary stop. Based on the environmental information and vehicle information, the determination unit 105 also determines that the vehicle 1 needs to make a temporary stop when there are obstacles such as other vehicles around the vehicle 1, for example.

When the determination unit 105 determines that the vehicle 1 needs to make a temporary stop (S614 "Yes"), the vehicle control unit 108 causes the vehicle 1 to make a temporary stop (S615).

The output control unit 107 then causes the display device 120 to display a notification screen making notification that the vehicle 1 will make a temporary stop (S616). The output control unit 107 waits by continuing to display the notification screen until the temporary stop of the vehicle 1 ends (S617 "No").

When the temporary stop of the vehicle 1 is complete (S617 "Yes"), the vehicle control unit 108 resumes travel by automated driving (S618).

The output control unit 107 then determines whether or not the vehicle 1 has reached the parking position 910 on the basis of the position of the vehicle 1 estimated by the estimation unit 104 (S619). When it is determined that the vehicle 1 has not reached the parking position 910 (S619 "No"), the processing to move the vehicle 1 to the parking position 910 continues by returning to the processing of S160. When it is determined that the vehicle 1 has reached the parking position 910 (S619 "Yes"), the travel route correction and automated driving processing end.

Note that although an example in which the notification screen is displayed during a temporary stop is illustrated in FIG. 8, the timing of the notification screen display is not limited to the time of a temporary stop, rather, the notification may be made when the steering angle or vehicle speed during automated driving is different from that during teaching travel.

Note that, in the flowcharts of FIGS. 7 and 8, it is assumed that the modification of the travel route information is executed after the vehicle 1 stops at the travel start position 900 and before same starts moving by automated driving, but the timing of the modification of the travel route information is not limited to this configuration. The modification of the travel route information may also be executed before the vehicle 1 stops at the travel start position 900. After the vehicle 1 starts to move by automated driving, the modification of the travel route information may also be executed as the vehicle 1 advances.

Furthermore, in the flowchart for FIG. 8, the modification unit 106 modifies the travel route information every time the determination unit 105 makes a determination, but the modification unit 106 may modify the travel route information after all the determinations are complete.

Dynamic determination processing, such as a temporary stop based on the detection of the presence of obstacles or the like around the vehicle 1, may also be performed by the vehicle control unit 108 instead of the determination unit 105.

Thus, the parking assistance device 100 according to this embodiment learns the travel route 80 for parking the vehicle 1 at the parking position 910 and the speed, steering angle, and braking operation of the vehicle 1 during the teaching travel, on the basis of the teaching travel by the driver, and then modifies the speed, the steering angle, or the braking operation of the vehicle 1 in the automatic travel from the speed, the steering angle, or the braking operation in the teaching travel, on the basis of any of the regulation for the automatic travel of the vehicle 1, the environmental information, or the geographic information. Therefore, with the parking assistance device 100 according to this embodiment, when the vehicle 1 automatically travels along the travel route 80 based on the teaching travel, the behavior of the vehicle 1 can be made suitable for travel by automated driving.

In addition, the regulation for automatic travel of the vehicle 1 is a regulation for the speed, the steering angle, or the necessity of a temporary stop of the vehicle 1, which is applied when the vehicle 1 travels automatically. With the parking assistance device 100 according to this embodiment, by changing from the speed, steering angle, or braking operation in the teaching travel so as to satisfy these regulations, the vehicle 1 can be made to behave in compliance with the regulations during automated driving, even when the driver does not comply with these regulations during teaching travel. Also, because the parking assistance device 100 is equipped with such a correction function, the driver is able to drive at a speed at which manual driving is straightforward when performing teaching travel, without the driver being forced to drive at a low speed that satisfies an automated driving regulation.

The regulation for automatic travel of the vehicle 1 is also defined by a law, or a standard. Therefore, the parking assistance device 100 according to this embodiment enables the vehicle 1 to be assisted in traveling in compliance with a law or a standard.

Furthermore, the regulation for automatic travel of the vehicle 1 is a regulation which is determined on the basis of passenger ride comfort or the effect on the people around the vehicle 1, during automatic travel of the vehicle 1. Therefore, the parking assistance device 100 according to this embodiment makes it possible, when the vehicle 1 is traveling automatically, to improve the ride comfort of passenger and the sense of security for those in the vicinity.

Second Embodiment

In this first embodiment, the parking assistance device 100 modifies the travel route information also when learning the travel route 80 using teaching travel, in addition to when performing parking assistance by automated driving.

The configuration of the vehicle 1 according to this embodiment is the same as the configuration according to the first embodiment illustrated in FIGS. 1 and 2. The hardware configuration and functional blocks of the parking assistance device 100 according to this embodiment are the same as those of the first embodiment illustrated in FIGS. 3 and 5. Similarly to the first embodiment, the parking assistance device 100 according to this embodiment is equipped with an acquisition unit 101, an extraction unit 102, a learning unit 103, an estimation unit 104, a determination unit 105, a modification unit 106, an output control unit 107, a vehicle control unit 108, a reception unit 109, and a storage unit 110.

In addition to having the same configuration as the first embodiment, when travel route information which includes the travel route 80 is generated on the basis of the teaching travel by the learning unit 103, the determination unit 105 according to this embodiment determines whether the travel route information satisfies the regulation for automatic travel of the vehicle 1.

In addition to having the same configuration as the first embodiment, when travel route information which includes the travel route 80 is generated on the basis of the teaching travel by the learning unit 103, the modification unit 106 according to this embodiment makes a modification to the speed, steering angle, or braking operation.

Figure 9:
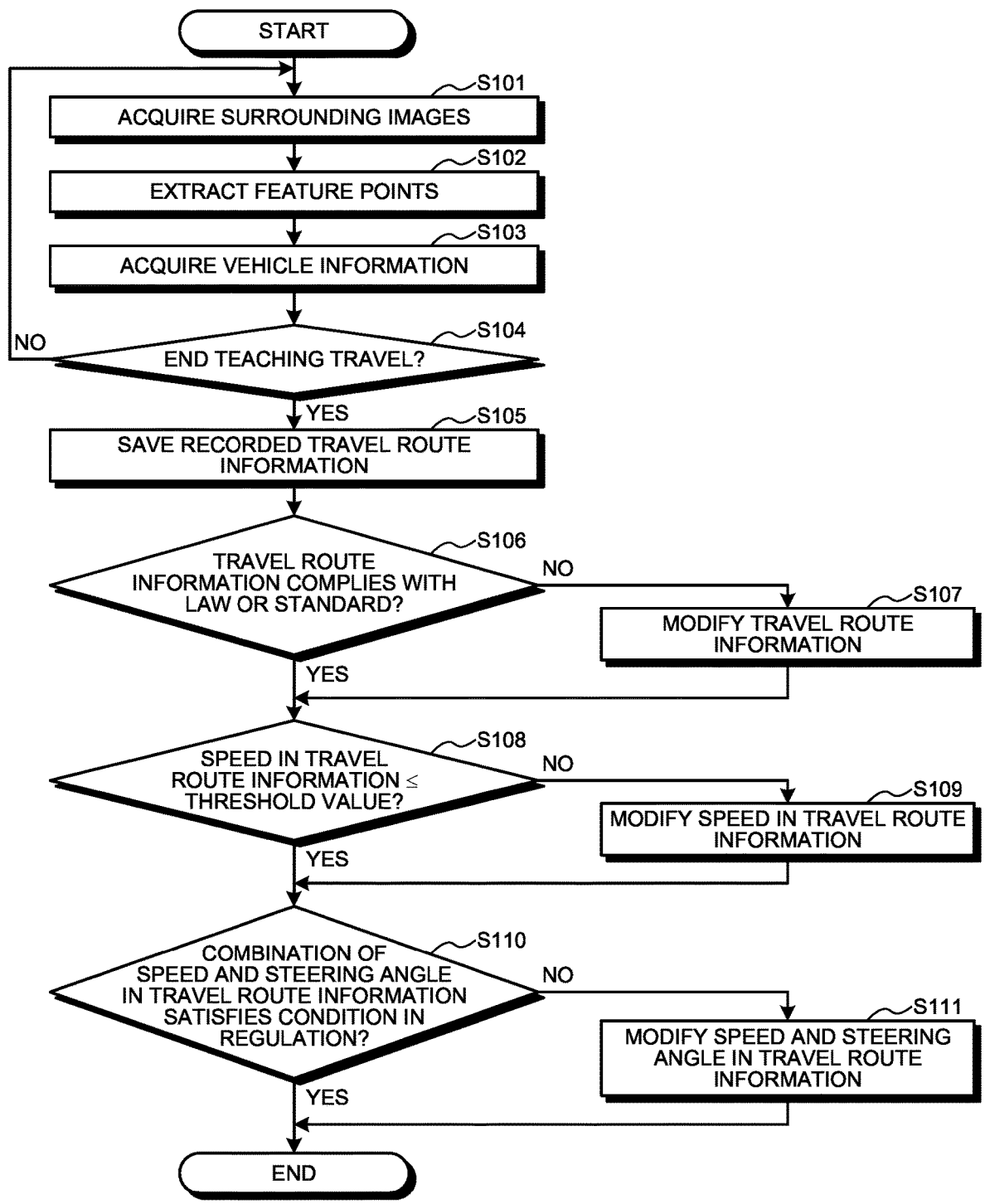
FIG. 9 is a flowchart illustrating an example of the flow of travel route information modification processing according to a second embodiment.

FIG. 9 is a flowchart illustrating an example of the flow of travel route information modification processing according to a second embodiment. The processing of this flowchart is started, for example, when the driver performs an operation to start registering the travel route information.

First, the acquisition unit 101 acquires surrounding images from the imaging devices 16 (S101).

The extraction unit 102 then extracts feature points from the surrounding images acquired by the acquisition unit 101 (S102).

In addition, the acquisition unit 101 acquires vehicle information (S103).

The reception unit 109 also determines whether or not an operation to end teaching travel has been received from the operation button 141 or the like (S104). The processing of S101 to S104 is repeated until the operation to end the teaching travel is received (S104 "No").

When the operation to end the teaching travel is received (S104 "Yes"), the learning unit 103 saves the recorded travel route 80, speed, steering angle, and braking operation of the teaching travel to the storage unit 110 as the travel route information (S105).

Next, the determination unit 105 determines whether or not the travel route information satisfies the regulation for automatic travel of the vehicle 1.

From the determination in S106 of whether or not the travel route information complies with a law or a standard to the processing in S111 to modify the speed and steering angle of the travel route information, the processing is the same as the processing from S604 to S609 in the flowchart of the first embodiment illustrated in FIG. 8.

Note that, according to this embodiment, although the travel route information is already corrected to satisfy the regulation for automatic travel of the vehicle 1 during learning, the determination unit 105 is configured to re-determine whether the travel route information satisfies the latest regulation for automatic travel of the vehicle 1 when the parking assistance using automatic travel is executed. The flow of this processing is the same as in the first embodiment.

Thus, when the travel route 80 is generated on the basis of teaching travel, the parking assistance device 100 according to this embodiment makes a modification to the speed, steering angle, or braking operation recorded in the teaching travel on the basis of the regulation for automatic travel of the vehicle 1, environmental information, and geographic information. Therefore, with the parking assistance device 100 according to this embodiment, being provided with the same functions as those of the first embodiment, because travel route information which has been updated in advance to a state satisfying the regulation is stored in the storage unit 110, the amount of modification during execution of parking assistance by automated driving is reduced, accordingly reducing the processing load for updating the travel route information during the execution of parking assistance.

Modification Example 1

In each of the foregoing embodiments, the modification unit 106 is assumed to be capable of modifying the speed, steering, and braking operations learned from the teaching travel, but not all of these need to be modifiable. The modification unit 106 should be able to modify at least the speed.

Modification Example 2

Furthermore, in the foregoing second embodiment, an example in which the travel route information is modified during learning based on teaching travel was described, but the timing for modifying the recorded travel information is not limited thereto. For example, after the travel route information has been saved in the storage unit 110, the determination unit 105 may determine whether the travel route information satisfies the latest regulation for automatic travel of the vehicle 1. In this case, depending on the result of the determination by the determination unit 105, the modification unit 106 updates the travel route information saved in the storage unit 110.

Modification Example 3

Further, a screen that is provided on an operation terminal such as a remote controller or electronic key when the driver disembarks from the vehicle 1 during automatic travel by the vehicle control unit 108 may be an example of the display unit. In this case, the output control unit 107 may cause the screen provided on the operation terminal to display the fact that the vehicle 1 behaves differently during automated driving than during teaching travel.

Modification Example 4

Further, the modification unit 106 may modify the speed, steering angle, or braking operation in automatic travel of the vehicle 1 from the speed, steering angle, or braking operation in teaching travel on the basis of the learned model in which the map information and the stopping position have been learned. Learned models are generated by, for example, deep learning or other machine learning.

Modification Example 5

In addition, when the travel route information includes an unnecessary temporary stop, the modification unit 106 may modify the braking operation of the travel route information based on teaching travel to avoid a temporary stop.

Modification Example 6

Further, in each of the foregoing embodiments, the parking assistance device 100 used the travel route in teaching travel during learning as the travel route 80 for automatic travel in home zone parking. However, the learning technique is not limited thereto.

For example, teaching travel may also be travel in which the driver uses manual driving to move the vehicle 1 from the parking position 910 to a teaching travel end position outside the parking position. In this case, the learning unit 103 generates a travel route 80 for home zone parking by replaying the route of the teaching travel in the reverse direction.

For example, the driver starts teaching travel from the state where the vehicle 1 is stopped at the parking position 910 in the garage 920, and moves the vehicle 1 forward to exit the garage 920. The driver then causes the vehicle 1 to travel out of the garage 920 to the desired teaching travel end position by further forward movement, and stops the vehicle 1. The learning unit 103 then records the teaching travel on the basis of the steering, braking, acceleration and deceleration during the teaching travel, and the feature points extracted from the surrounding images. Based on the recorded teaching travel, the learning unit 103 generates the travel route 80 in which the vehicle 1 travels backward from the end position of the teaching travel to the parking position 910 in the garage 920. Using this technique, the end position of the teaching travel becomes the travel start position 900 for automatic travel. Such a technique is also called reverse playback of the travel route.

In general, in manual driving, it is easier to move the vehicle 1 out of the garage 920 than to move the vehicle 1 into the garage 920. Conversely, if such a learning technique is used, even when the driver is not good at moving the vehicle 1 backward to enter the garage 920, the travel route 80 for home zone parking can be generated by teaching travel in which the driver moves the vehicle 1 forward to exit the garage 920. Note that, although a case where the driver moves the vehicle 1 forward in teaching travel is described as an example in this modification example, the driver may also move the vehicle 1 backward in teaching travel.

The parking assistance device, the parking assistance method, and a computer-readable medium according to the present disclosure enable the behavior of a vehicle to be placed in a state suitable for travel by automated driving when the vehicle is traveling automatically along a travel route based on teaching travel.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assistance device that performs automatic travel of a vehicle based on teaching travel by a driver, the parking assistance device comprising:
   a memory; and
   a hardware processor coupled to the memory, the hardware processor being configured to:
      learn a travel route for parking the vehicle in a parking position during the teaching travel, based on the teaching travel;
      perform an automatic travel based on the travel route; and
      modify the travel route to move away from an obstacle, when the obstacle is in a vicinity of the travel route in the automatic travel of the vehicle, based on environmental information relating to an environment around the vehicle,
   wherein a first vehicle speed during the automatic travel is slower than a second vehicle speed during the teaching travel,
   the first vehicle speed during the automatic travel is slower than a threshold value for a vehicle speed during the automatic travel, and
   the threshold value for the vehicle speed during the automatic travel is a value of a speed slower than 10 km/h.

2. The parking assistance device according to claim 1, wherein the hardware processor is further configured to modify the travel route based on a regulation for the automatic travel of the vehicle, the regulation being for a speed, a steering angle, or a necessity of a temporary stop of the vehicle, which is applied when the vehicle travels automatically.

3. The parking assistance device according to claim 1, wherein the hardware processor is further configured to modify the travel route based on a regulation for the automatic travel of the vehicle, the regulation being defined by a law or a standard.

4. The parking assistance device according to claim 1, wherein the hardware processor is further configured to modify the travel route based on a regulation for the automatic travel of the vehicle, the regulation being determined based on ride comfort of a passenger or an effect on people around the vehicle during the automatic travel of the vehicle.

5. The parking assistance device according to claim 1, wherein the environmental information includes presence or absence of the obstacle around the vehicle and a distance between the vehicle and the obstacle.

6. The parking assistance device according to claim 1, wherein the environmental information includes map information.

7. The parking assistance device according to claim 1, wherein the hardware processor is further configured to notify a passenger of the vehicle that the vehicle will behave differently than during the teaching travel, when modifying the second vehicle speed of the vehicle to be the first vehicle speed of the vehicle during the automatic travel.

8. The parking assistance device according to claim 1, wherein the hardware processor is further configured to cause the vehicle to move to the parking position by automated driving based on the first vehicle speed.

9. The parking assistance device according to claim 1, wherein the hardware processor is configured to make a modification from the second vehicle speed to the first vehicle speed when automated driving based on the travel route is started.

10. The parking assistance device according to claim 1, wherein the hardware processor is further configured to make a modification to a steering angle or a braking operation when the travel route is generated based on the teaching travel.

11. The parking assistance device according to claim 1, wherein the hardware processor is configured to modify at least one of the vehicle speed, a steering angle, or a braking operation in the automatic travel of the vehicle from the second vehicle speed, the steering angle, or the braking operation in the teaching travel, based on a learned model in which map information and a stopping position have been learned.

12. The parking assistance device according to claim 1, wherein
the teaching travel is travel in which the driver moves the vehicle from a travel start position outside the parking position to the parking position by using manual driving, and
the hardware processor is configured to learn the travel start position in the teaching travel as a start position of the travel route.

13. The parking assistance device according to claim 1, wherein
the teaching travel is travel in which the driver moves the vehicle from the parking position to a teaching travel end position outside the parking position by using manual driving, and
the hardware processor is configured to perform learning by using the teaching travel end position as a start position of the travel route, and using, as the travel route, a route through which the vehicle travels in a reverse direction to that of the teaching travel.

14. A parking assistance method that performs automatic travel of a vehicle based on teaching travel by a driver, the parking assistance method comprising:
learning a travel route for parking the vehicle in a parking position during the teaching travel, based on the teaching travel;
performing an automatic travel based on the travel route; and
modifying the travel route to move away from an obstacle, when the obstacle is in a vicinity of the travel route in the automatic travel of the vehicle, based on environmental information relating to an environment around the vehicle,
wherein a first vehicle speed during the automatic travel is slower than a second vehicle speed during the teaching travel,
the first vehicle speed during the automatic travel is slower than a threshold value for a vehicle speed during the automatic travel, and
the threshold value for the vehicle speed during the automatic travel is a value of a speed slower than 10 km/h.

15. A non-transitory computer-readable medium on which an executable program is recorded, the program instructing a computer to perform automatic travel of a vehicle based on teaching travel by a driver, the program instructing the computer to carry out:
learning a travel route for parking the vehicle in a parking position during the teaching travel, based on the teaching travel;
performing an automatic travel based on the travel route; and
modifying the travel route to move away from an obstacle, when the obstacle is in a vicinity of the travel route in the automatic travel of the vehicle, based on environmental information relating to an environment around the vehicle,
wherein a first vehicle speed during the automatic travel is slower than a second vehicle speed during the teaching travel,
the first vehicle speed during the automatic travel is slower than a threshold value for a vehicle speed during the automatic travel, and
the threshold value for the vehicle speed during the automatic travel is a value of a speed slower than 10 km/h.

* * * * *